US011963592B2

(12) United States Patent
Ponte et al.

(10) Patent No.: US 11,963,592 B2
(45) Date of Patent: Apr. 23, 2024

(54) CASE FOR STORING ARTICLES

(71) Applicants: Michael A. Ponte, Jensen Beach, FL (US); Deborah E. Ponte, Jensen Beach, FL (US)

(72) Inventors: Michael A. Ponte, Jensen Beach, FL (US); Deborah E. Ponte, Jensen Beach, FL (US)

( * ) Notice: Subject to any disclaimer, the term of this patent is extended or adjusted under 35 U.S.C. 154(b) by 85 days.

(21) Appl. No.: 17/546,138

(22) Filed: Dec. 9, 2021

(65) Prior Publication Data

US 2022/0183435 A1 Jun. 16, 2022

Related U.S. Application Data

(60) Provisional application No. 63/125,448, filed on Dec. 15, 2020.

(51) Int. Cl.

| | |
|---|---|
| ***A45C 11/34*** | (2006.01) |
| ***A45C 13/00*** | (2006.01) |
| ***A45C 13/02*** | (2006.01) |
| ***A45C 13/10*** | (2006.01) |
| ***A45C 15/00*** | (2006.01) |
| ***B43L 23/00*** | (2006.01) |

(52) U.S. Cl.

CPC ............ *A45C 11/34* (2013.01); *A45C 13/005* (2013.01); *A45C 13/02* (2013.01); *A45C 13/1069* (2013.01); *A45C 15/00* (2013.01); *B43L 23/00* (2013.01)

(58) Field of Classification Search

CPC .......... A45C 11/34; A45C 13/02; B65D 85/00

USPC .......................................................... 206/575

See application file for complete search history.

(56) References Cited

U.S. PATENT DOCUMENTS

| | | | | |
|---|---|---|---|---|
| 3,727,771 A * | 4/1973 | Hoffman | ................ | B25H 3/003 D8/71 |
| 4,136,773 A | 1/1979 | Booth | | |
| 5,025,817 A * | 6/1991 | Wen | ..................... | A45D 33/006 206/823 |
| D325,934 S * | 5/1992 | Ramljak | ...................... | D11/147 |
| 6,021,891 A | 2/2000 | Anderson | | |

(Continued)

FOREIGN PATENT DOCUMENTS

| | | |
|---|---|---|
| CN | 201675252 U | 12/2010 |
| CN | 201847017 U | 6/2011 |

(Continued)

*Primary Examiner* — Ernesto A Grano
*Assistant Examiner* — Symren K Sanghera
(74) *Attorney, Agent, or Firm* — Frost Brown Todd LLP

(57) ABSTRACT

A case for storing articles includes a base including a lower body having a first hemispherical side surface, a flat external bottom surface, and an interior cavity. The base has a platform secured to the lower body within the interior cavity. The platform includes first and second receptacles for retaining first and second articles, respectively, at first and second heights relative to the external bottom surface, respectively. The first height is different from the second height. The case includes a lid coupled to the base such that the lid is movable relative to the base between an open state and a closed state. The lid includes an upper body having a second hemispherical side surface and a dome-shaped internal ceiling surface defining a storage chamber for receiving tops of the articles when the lid is in the closed state.

12 Claims, 12 Drawing Sheets

(56) References Cited

U.S. PATENT DOCUMENTS

| | | | | | |
|---|---|---|---|---|---|
| 6,026,960 | A * | 2/2000 | Cogliano | A63H 3/005 206/457 |
| D618,280 | S | 6/2010 | Siegel | |
| D638,475 | S * | 5/2011 | Hung | D19/85 |
| 8,651,308 | B1 * | 2/2014 | Sung | A45D 40/00 220/4.24 |
| 2006/0063621 | A1 * | 3/2006 | Bell | A63B 47/00 206/315.9 |
| 2006/0261017 | A1 * | 11/2006 | Yoon | B43M 99/007 211/69.1 |
| 2009/0016799 | A1 | 1/2009 | Bellas | |
| 2009/0057083 | A1 * | 3/2009 | Serrano | A45C 13/262 190/115 |
| 2009/0218240 | A1 * | 9/2009 | Allen | B65D 43/161 206/214 |
| 2016/0021915 | A1 * | 1/2016 | Baxter | B65D 85/60 426/295 |
| 2016/0366999 | A1 * | 12/2016 | Glick | B43M 99/008 |

FOREIGN PATENT DOCUMENTS

| | | | |
|---|---|---|---|
| CN | 209473920 | U | 10/2019 |
| KR | 200259048 | Y1 * | 9/2001 |
| KR | 200281529 | Y1 * | 1/2002 |
| KR | 200432668 | Y1 | 12/2006 |

* cited by examiner

CASE FOR STORING ARTICLES

PRIORITY

This application claims priority to U.S. Provisional Patent App. No. 63/125,448, entitled "Case for Storing Articles," filed Dec. 15, 2020, the disclosure of which is incorporated by reference herein.

BACKGROUND

Various types of articles benefit from being stored in an organized fashion. For instance, drawing utensils (or "writing utensils"), such as crayons, markers, pens, pencils, and chalk sticks, are well-known instruments for applying a visually discernible substance, such as pigmented wax, ink, graphite, and chalk, to a substrate for drawing, sketching, and/or writing. Such drawing utensils are frequently available in large quantities and in a variety of different colors to allow users to customize the color palettes of their creative works. As a result, an individual user may desire to store a large number of drawing utensils together when they are not in use, such as in a drawing utensil case, to protect the drawing utensils from loss or damage. Similarly, a user may desire to store various other types of useful and/or ornamental articles together.

While certain cases for storing articles are known, it is believed that no one prior to the inventors has made or used the invention described in the appended claims.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Exemplary Article Storage Cases

In some instances, it may be desirable to provide a case for storing articles such as drawing utensils that displays the articles in an organized and accessible manner to assist the user with readily identifying and accessing a particular article which the user desires to use. Each of the exemplary article storage cases (10, 110, 210) described below functions in such a manner.

A. Exemplary Article Storage Case Having Pivotable Lid

Figure 1A:
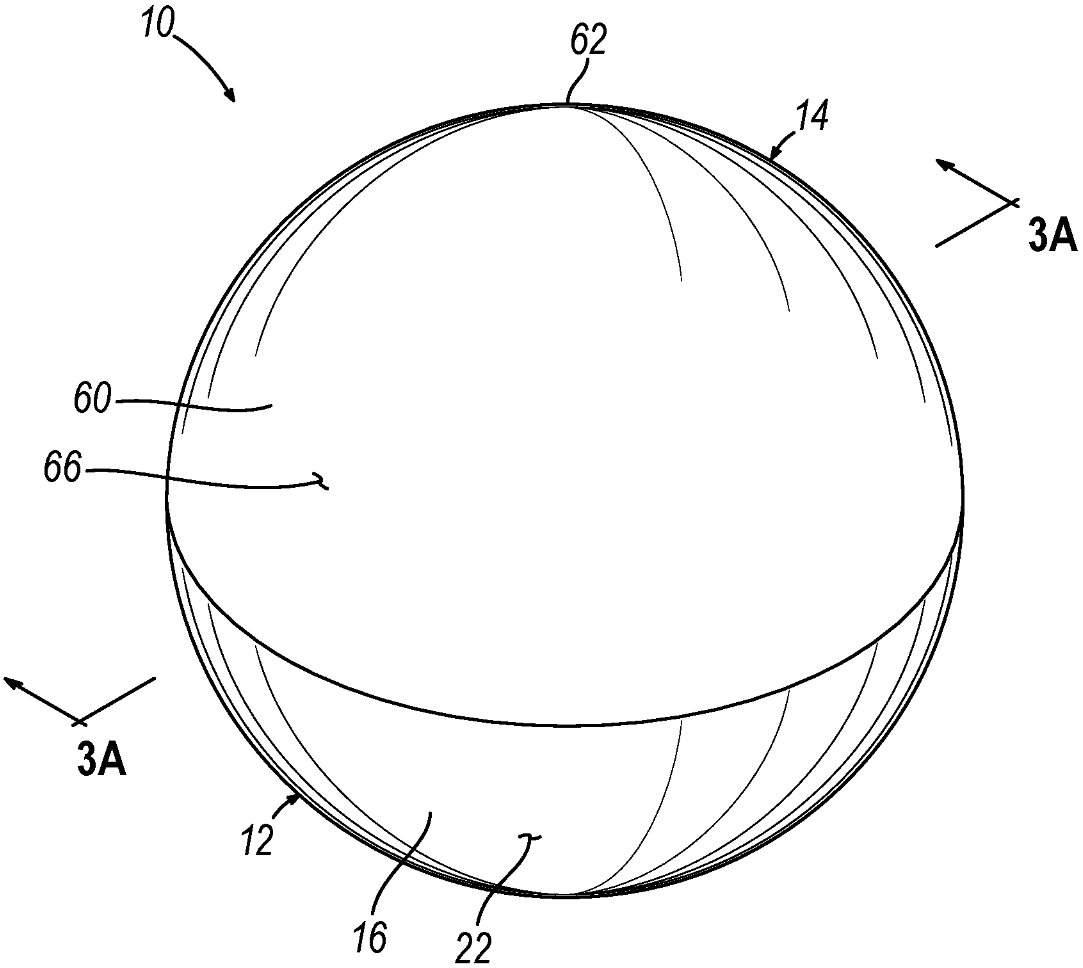
FIG. 1A depicts an upper front perspective view of an exemplary article storage case, showing a lid of the article storage case in a closed state.
Figure 1B:
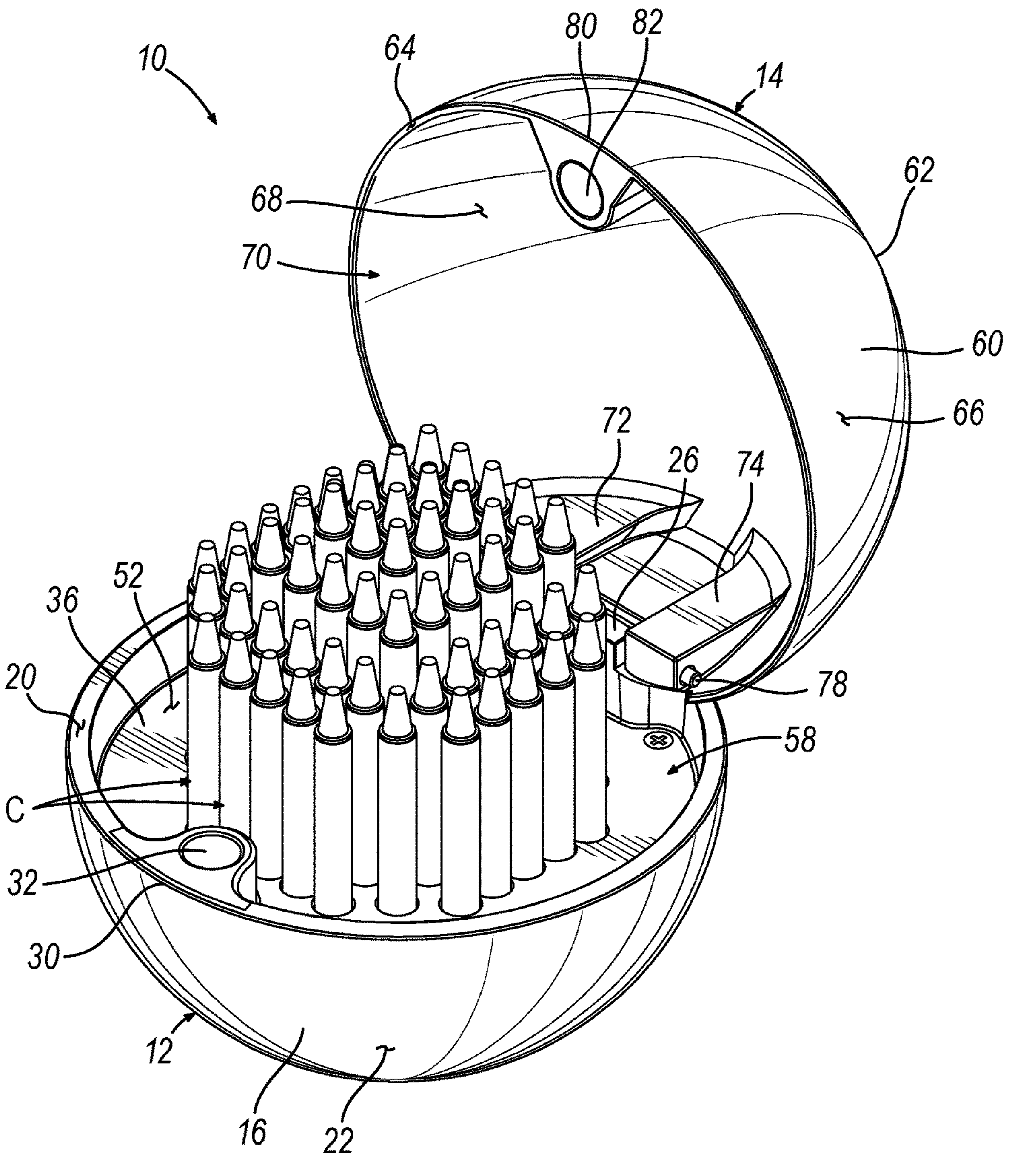
FIG. 1B depicts an upper front perspective view similar to FIG. 1A, showing the lid in an open state for displaying and accessing a plurality of articles.
Figure 1C:
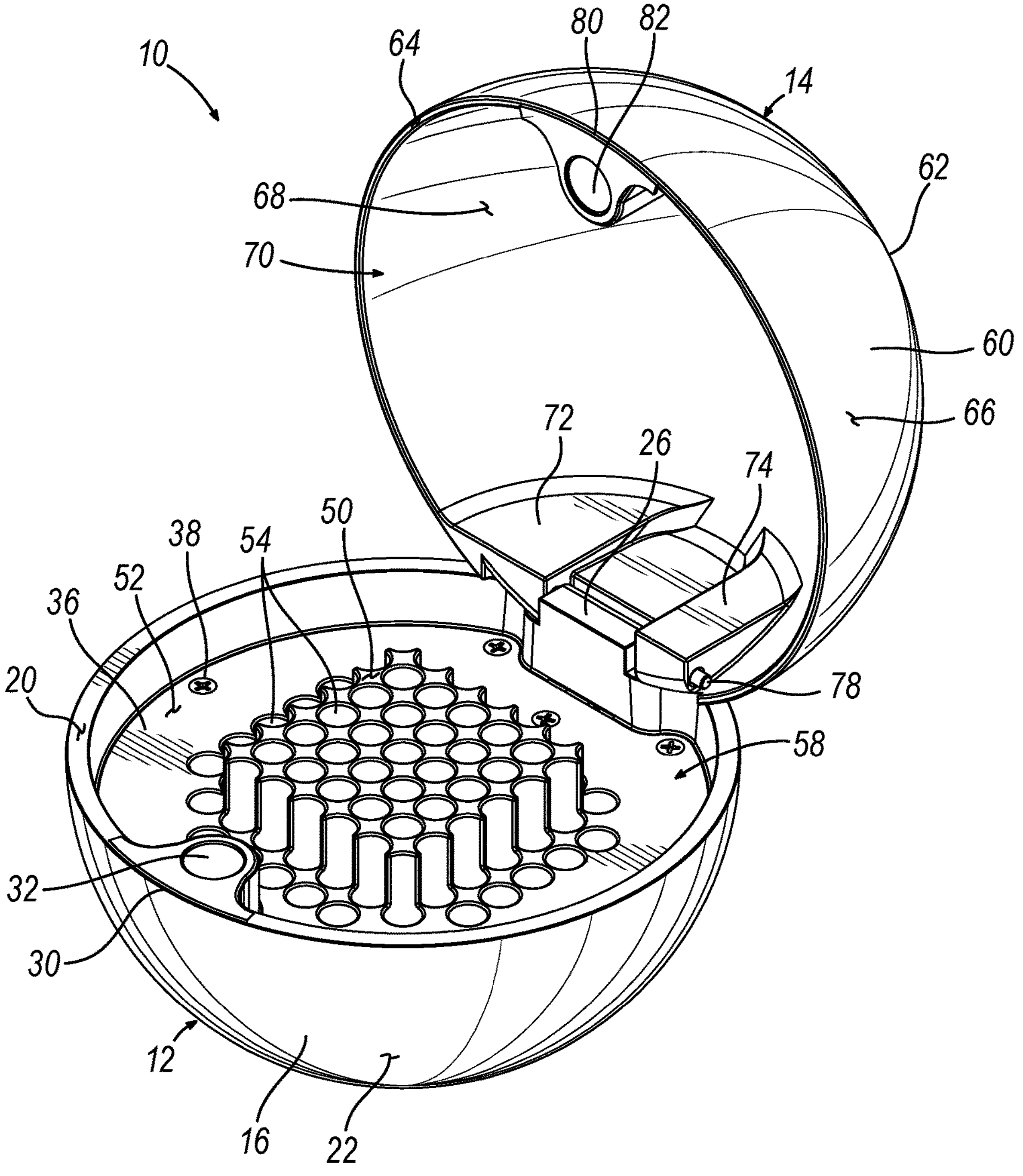
FIG. 1C depicts an upper front perspective view similar to FIG. 1B, omitting the plurality of articles.
Figure 2:
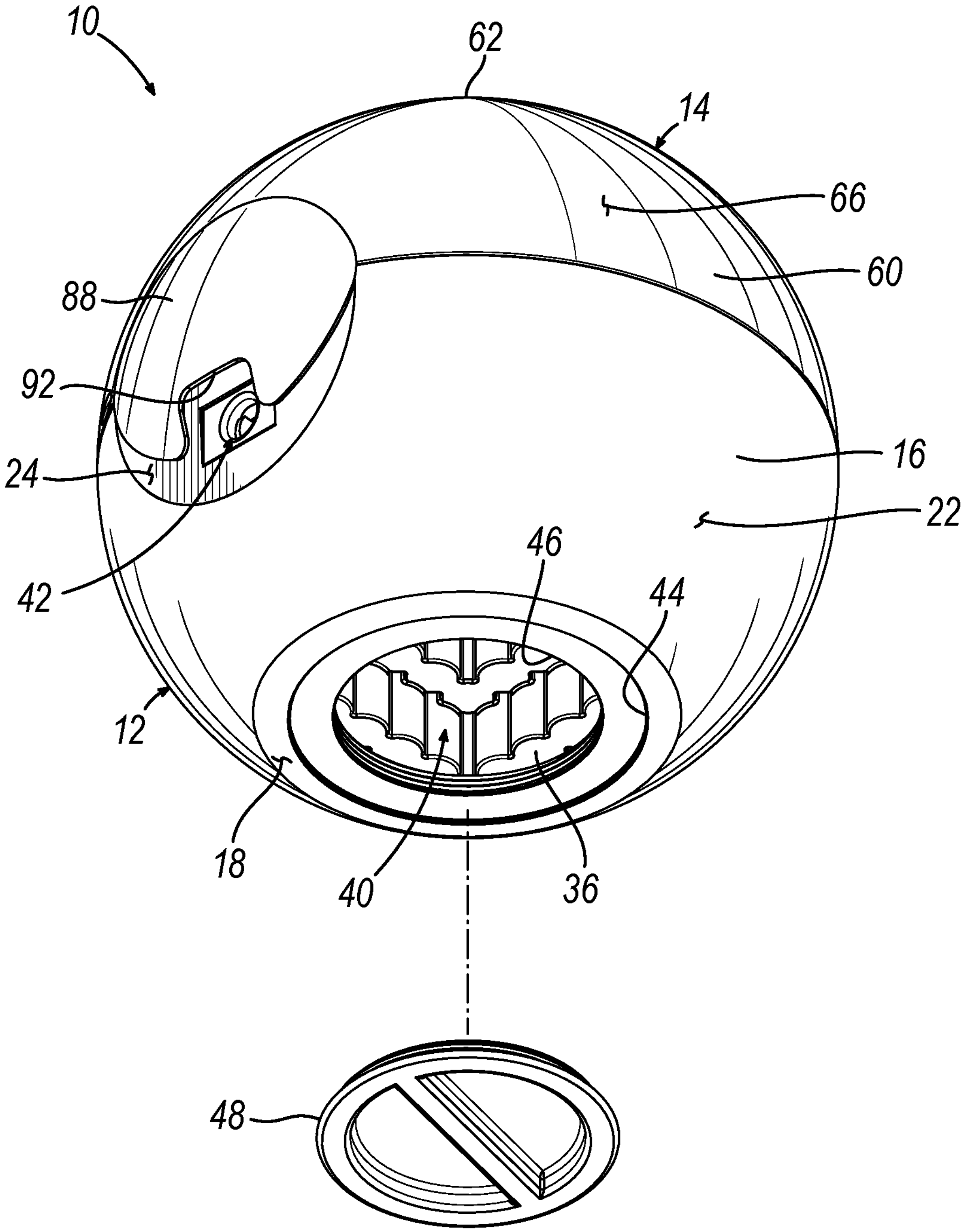
FIG. 2 depicts a lower rear perspective view of the article storage case of FIG. 1A, showing the lid in the closed state, and further showing a dump door of the base selectively removed from a lower body of the base for accessing a waste chamber of the base.
Figure 3A:
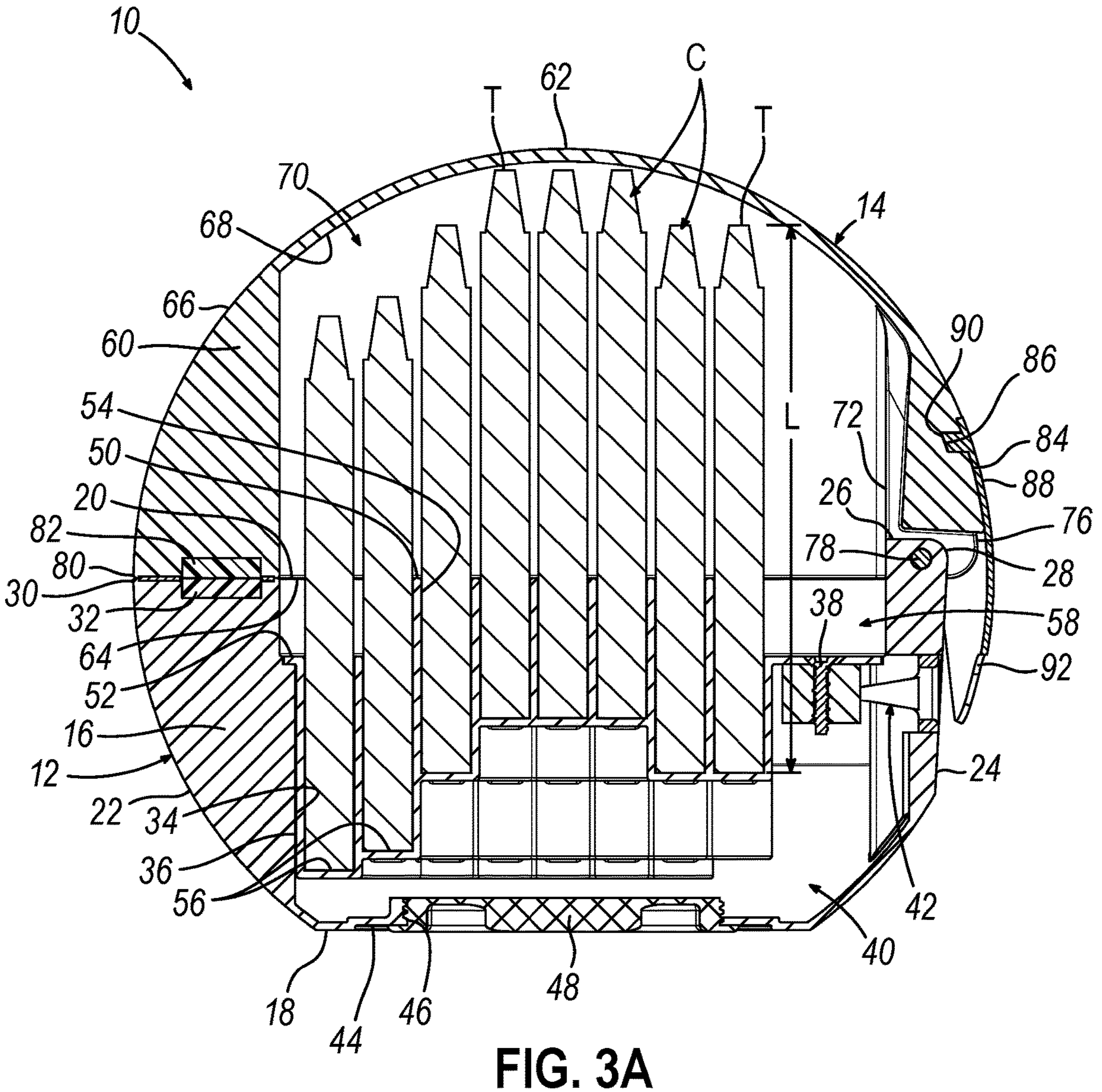
FIG. 3A depicts a cross sectional view of the article storage case of FIG. 1A, taken along section line 3A-3A in FIG. 1A, showing the lid in the closed state, and further showing the plurality of articles securely housed within a storage chamber of the article storage case.
Figure 3B:
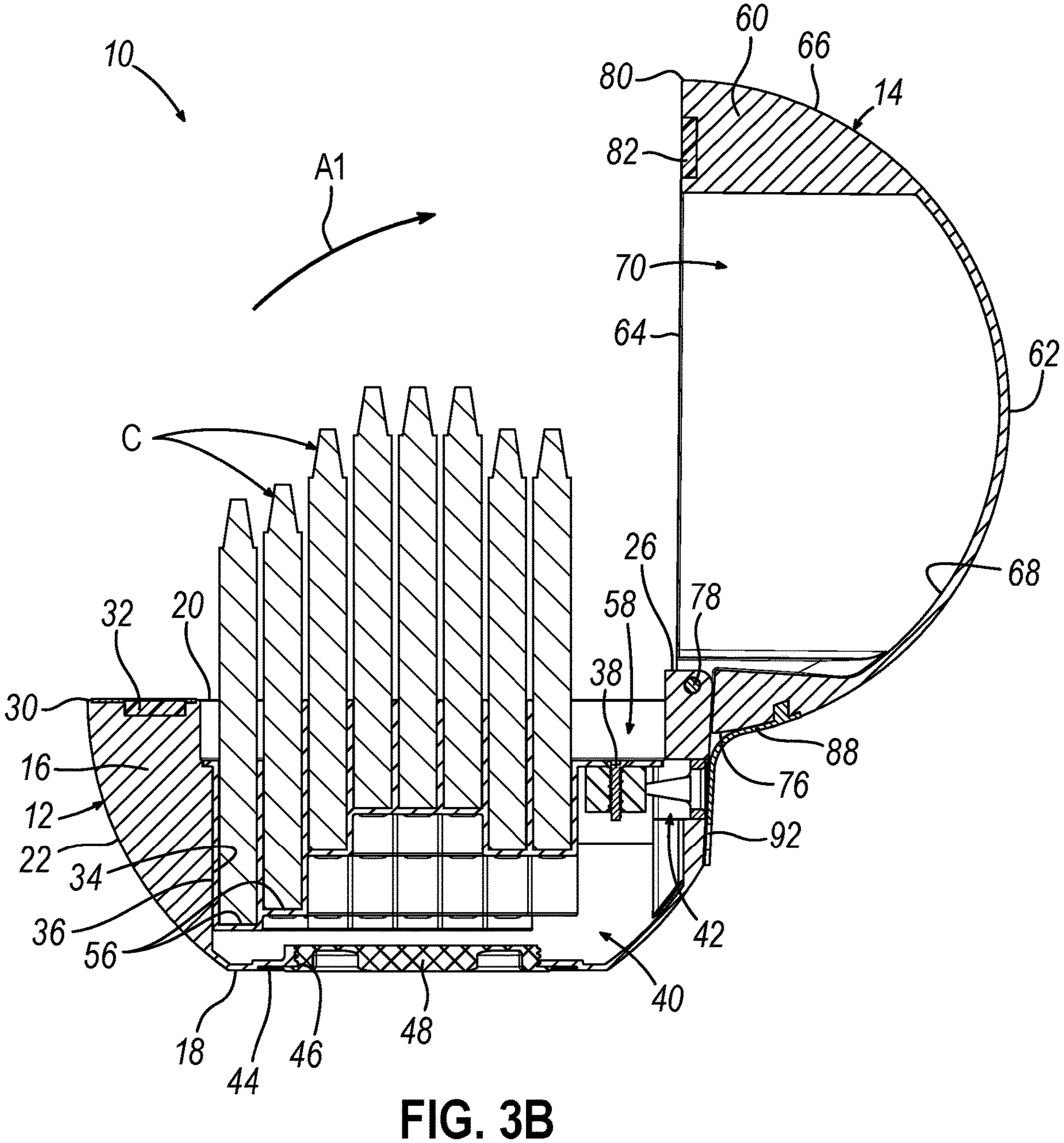
FIG. 3B depicts a cross sectional view similar to FIG. 3A, showing the lid pivoted to the open state for displaying and accessing the plurality of articles.

FIGS. 1A-3B show an exemplary article storage case (10) comprising a base (12) and a lid (14) movably coupled to base (12) such that lid (14) is movable relative to base (12) between a closed state for securely storing a plurality of articles shown in the form of crayons (C) (FIGS. 1A and 3A) and an open state for displaying and providing easy access to crayons (C) (FIGS. 1B and 3B). While cases (10, 110, 210) are shown and described herein in connection with articles in the form of crayons (C), it will be understood that cases (10, 110, 210) may be used to store various other types of drawing utensils in other applications. By way of example only, such alternative drawing utensils may include markers, pens, pencils, or chalk sticks. Furthermore, cases (10, 110, 210) may be used to store various other types of articles, which may or may not be generally elongate and/or cylindrical, that will be readily apparent to those of ordinary skill in the art in view of the teachings herein. By way of example only, such articles may include various types of cosmetics (e.g., lipsticks, eyeliners, etc.), tools, and other useful and/or ornamental items.

Base (12) of the present example includes a lower body (16) having a generally flat, annular external bottom surface (18) for stably supporting lower body (16) on a flat surface (e.g., a tabletop), a generally flat, annular top surface (20), a generally hemispherical external side surface (22) extending upwardly and radially outwardly from bottom surface (18) to top surface (20), and a generally flat external rear surface (24) such that base (12) has a generally truncated hemispherical profile. In the example shown, lower body (16) further includes a lower hinge knuckle (26) extending upwardly relative to top surface (20) at or near external rear surface (24) to define a hinged end (28) of base (12). An occluding end (30) of base (12) is defined opposite hinged end (28), and a lower magnet (32) having a first polarity is positioned at or near occluding end (30), as described in greater detail below.

As best shown in FIGS. 3A-3B, lower body (16) also defines a lower interior cavity (34), and base (12) further includes a platform (36) positioned at least partially within lower interior cavity (34) and fixedly secured to lower body (16) via one or more fasteners, such as screws (38). In the example shown, platform (36) is spaced apart from a bottom of lower interior cavity (34) to define a waste chamber (40). In this regard, base (12) of the present example further includes a sharpener (42) extending radially inwardly from rear surface (24) below platform (36) into waste chamber (40) and fixedly secured to platform (36) via another fastener, such as a screw (38). Sharpener (42) is configured to sharpen crayons (C) and to deposit shavings caused by such sharpening directly into waste chamber (40). As shown, lower body (16) includes an annular recess (44) defined in bottom surface (18) and an opening (46) defined in recess (44) in communication with waste chamber (40). Recess (44) and/or opening (46) may be configured to selectively receive a dump door (48) of base (12). More particularly, dump door (48) may be removably coupled to lower body (16) at recess (44) and/or opening (46) to selectively cover opening (46) for selectively maintaining shavings within waste chamber (40) and selectively emptying shavings from waste chamber (40). For example, dump door (48) may be configured to threadably and/or frictionally engage lower body (16) at recess (44) for facilitating removable coupling of dump door (48) thereto. In some versions, dump door (48) may be recessed from and/or substantially flush with bottom surface (18) when removably coupled to lower body (16) to avoid interfering with and/or to assist with stably supporting lower body (16) on a flat surface.

Platform (36) of the present example includes first and second upwardly-facing top surfaces (50, 52) and an array of receptacles in the form of bores (54) extending downwardly from first and/or second top surfaces (50, 52) to respective upwardly-facing floor support surfaces (56) for receiving corresponding crayons (C). In the example shown, second top surface (52) is spaced apart from a top of lower interior cavity (34) to define a lower storage chamber portion (58), as described in greater detail below.

First top surface (50) is radially inward of and raised above second top surface (52), and floor support surfaces (56) are provided at varying heights relative to bottom surface (18) such that platform (36) has a generally stepped profile. More particularly, at least some radially adjacent (e.g., adjacent to each other in a radial direction) sets of floor support surfaces (56) are vertically offset (or "staggered") from each other such that when crayons (C) having a same length (L) as each other are positioned on vertically offset floor support surfaces (56), the tops (T) of such crayons (C) are likewise vertically offset from each other in a multi-tiered arrangement. For example, floor support surfaces (56) may be progressively higher in a radially inward direction, such that the radially outermost floor support surfaces (56) are at a minimum height, the radially innermost floor support surfaces (56) are at a maximum height, and the radially intermediate floor support surfaces (56) are at intermediate heights progressively increasing from the radially outermost floor support surfaces (56) toward the radially innermost floor support surfaces (56). As shown, the height differential between radially adjacent sets of floor support surfaces (56) may also vary, and some radially adjacent sets of floor support surfaces (56) may be positioned at a same height as each other, such as those at or near the radially innermost floor support surfaces (56) and/or those proximate to hinged end (28). Moreover, at least some circumferentially or otherwise perimetrically adjacent (e.g., adjacent to each other in a circumferential or otherwise perimetrical direction) sets of floor support surfaces (56) may be positioned at a same height as each other. In this manner, when crayons (C) having the same length (L) as each other are positioned on floor support surfaces (56), the tops (T) of such crayons (C) may cascade downwardly in a radially outward direction to provide a "stadium seating" arrangement (e.g., when viewed from the front or either side of article storage case (10)).

In the example shown, floor support surfaces (56) of platform (36) are positioned at four different heights (e.g., relative to bottom surface (18)). More particularly, at least some of a first, radially outermost set of circumferentially adjacent floor support surfaces (56) are each positioned at a first height (some members of this set may be omitted proximate to hinged end (28), such as to accommodate sharpener (42)). At least some of a second set of circumferentially adjacent floor support surfaces (56) radially adjacent to the first set in the radially inward direction are each positioned at a second height (some members of this set, such as those proximate to hinged end (28), may alternatively be positioned at a third height). At least some of a third set of circumferentially adjacent floor support surfaces (56) radially adjacent to the second set in the radially inward direction are each positioned at a third height. At least some of a fourth set of circumferentially adjacent floor support surfaces (56) radially adjacent to the third set in the radially inward direction are each positioned at a fourth height. The radially innermost floor support surfaces (56) radially adjacent to the fourth set in the radially inward direction are also positioned at the fourth height.

As shown, each bore (54) is configured to receive a corresponding crayon (C). Bores (54) may be configured to retain the corresponding crayons (C) in a secure and upright manner. For example, bores (54) may each have a diameter equal to or slightly greater than a diameter of crayons (C) so as to frictionally engage the corresponding crayon (C). Additionally, or in the alternative, bores (54) may have a depth equal to or greater than about a third of the length (L) of crayons so as to receive a substantial portion of the corresponding crayon (C) sufficient to prevent the corresponding crayon (C) from tipping over while also allowing a top (T) of the corresponding crayon (C) to protrude sufficiently therefrom for gripping by the user. While platform (36) of the present example includes receptacles in the form of a plurality of discrete bores (54) isolated from each other for receiving individual respective crayons (C), it will be appreciated that any other suitable type of receptacle may used for receiving crayons (C), such as annular or semi-annular recesses for receiving pluralities of respective crayons (C). Radially adjacent sets of such recesses may be either isolated from or in communication with each other, and may have vertically offset floor support surfaces arranged in a manner similar to floor support surfaces (56).

Lid (14) of the present example includes an upper body (60) having a top (62), a generally flat, annular bottom surface (64) configured to abut or otherwise confront top surface (20) of base (12) when lid (14) is in the closed state, and a generally hemispherical external side surface (66) extending upwardly and radially inwardly from bottom surface (64) to top (62) such that lid (14) has a generally hemispherical profile. In some versions, hemispherical external side surfaces (22, 66) of lower and upper bodies (16, 60) may have a same or similar radius as each other, such that base (12) and lid (14) may collectively provide article storage case (10) with a generally spherical (e.g., truncated spherical) profile when lid (14) is in the closed state, as best shown in FIG. 1A.

Upper body (60) includes a generally dome-shaped internal ceiling surface (68) which defines an upper storage chamber portion (70) configured to communicate with lower storage chamber portion (58) to collectively define a storage chamber and to receive at least tops (T) of crayons (C) retained in bores (54) when lid (14) is in the closed state, as best shown in FIG. 3A. In this regard, ceiling surface (68) is spaced apart from top surfaces (50, 52) of platform when lid (14) is in the closed state to accommodate the staggered heights of tops (T) of crayons (C) by providing upper storage chamber portion (70) with a maximum height at or near a radially innermost portion thereof to fit the maximum heights of tops (T) of crayons (C) supported by radially innermost floor support surfaces (56). Ceiling surface (68) is also suitably shaped to provide a gradually decreasing height of upper storage chamber portion (70) in the radially outward direction to generally track the decreasing heights of tops (T) of crayons (C) in the radially outward direction. For example, ceiling surface (68) may be vertically spaced apart from each floor support surface (56) when lid (14) is in the closed state by at least a minimum clearance equal to or greater than the length (L) of crayons (C).

In the example shown, upper body (60) further includes a pair of upper hinge knuckles (72, 74) extending inwardly relative to ceiling surface (68) and spaced apart from each other to receive lower hinge knuckle (26) therebetween and to define a hinged end (76) of lid (14) that is configured to pivotably couple to hinged end (28) of base (12). In this regard, lid (14) of the present example is pivotably coupled to base (12) via a hinge pin (78) extending through lower and upper hinge knuckles (26, 72, 74) such that lid (14) is pivotable about hinge pin (78) relative to base (12) between the closed state (FIGS. 1A, 2, and 3A) in which crayons (C) are securely housed within the storage chamber and the open state (FIGS. 1B, 1C, and 3B) in which crayons (C) are displayed in an organized and accessible manner. Thus, hinge knuckles (26, 72, 74) and hinge pin (78) may collectively define a hinge of article storage case (10). In some versions, lid (14) may be resiliently biased toward one of the open or closed states, such as via a torsion spring or any other suitable biasing member (not shown) incorporated into the hinge.

An occluding end (80) of lid (14) is defined opposite hinged end (76) and is configured to abut or otherwise confront occluding end (30) of base (12) when lid (14) is in the closed state and to be spaced apart from occluding end (30) of base (12) by a distance sufficiently great to allow the user to position crayons (C) within bores (54) and remove crayons (C) therefrom when lid (14) is in the open state. An upper magnet (82) having a second polarity different from the first polarity is positioned at or near occluding end (80) and is configured to magnetically attract lower magnet (32) of base (12) when lid (14) is in the closed state. In this regard, lid (14) may be selectively maintained in the closed state, to prevent lid (14) from inadvertently pivoting from the closed state toward the open state, via the magnetic attraction between lower and upper magnets (32, 82). More particularly, such magnetic attraction may resist pivoting of lid (14) from the closed state toward the open state. For example, lower and upper magnets (32, 82) may be configured to cooperatively prevent pivoting of lid (14) from the closed state toward the open state until a threshold separation force is applied by a user between lid (14) and base (12) sufficient to overcome the magnetic attraction between lower and upper magnets (32, 82) and thereby pivot lid (14) away from base (12), as indicated by arrow (A1) in FIG. 3B. Thus, magnets (32, 82) may collectively define a magnetic latch of article storage case (10). It will be appreciated that any other suitable type of latch may be used in place of or in addition to this magnetic latch for selectively maintaining lid (14) in the closed state, such as a clasping latch, a snap-fit latch, or a hook-and-loop latch, for example.

In the example shown, upper body (60) further includes a rear recess (84) defined in external side surface (66) and at least one notch (86) defined in recess (84) for securely retaining a pinch guard (88) of lid (14) to upper body (60). In this regard, pinch guard (88) includes at least one prong (90) configured to frictionally engage the at least one notch (86). In some versions, prong (90) may be secured to notch (86) via an adhesive. In any event, pinch guard (88) is configured to cover pinch points between hinged ends (28, 76) of base (12) and lid (14) to prevent accidental pinching of the user's finger therebetween during pivoting of lid (14) between the open and closed states. In this regard, pinch guard (88) may be constructed of a flexible material such as silicone to allow pinch guard (88) to flex during such pivoting of lid (14) between the open and closed states and to remain flexed when lid (14) is in the open state, as best shown in FIG. 3B. As best shown in FIGS. 2 and 3A, pinch guard (88) may be contoured to generally track the curvature of external side surfaces (22, 66) when lid (14) is in the closed state to assist with providing article storage case (10) with a generally spherical profile when lid (14) is the closed state (e.g., by at least partially concealing rear surface (24)). Pinch guard (88) of the present example also includes a slot (92) for providing access to sharpener (42) at least when lid (14) is in the closed state.

In some versions, upper body (60) may be constructed of a transparent material to allow the user to view crayons (C) within the storage chamber through upper body (60) while lid (14) is in the closed state. In addition, or alternatively, one or more external surfaces of base (12) and/or lid (14), such as external side surfaces (22, 66) of lower and/or upper bodies (16, 60) and/or an external surface of pinch guard (88), may include indicia and/or embossed elements which may be representative of an object having a similar external shape as article storage case (10), such as an object having a generally spherical shape. For example, external side surfaces (22, 66) of lower body (16) and upper body (60) may include indicia and/or embossed elements collectively representative of a globe (e.g., of Earth), such as for educational purposes. Such indicia may be printed or otherwise affixed to external side surfaces (22, 66) of lower body (16) and/or upper body (60). Thus, the generally spherical shape of article storage case (10) when lid (14) is in the closed position may allow article storage case (10) to simulate other generally spherical objects. In addition, or alternatively, the generally spherical shape of article storage case (10) when lid (14) is in the closed position may assist the user with gripping or otherwise handling article storage case (10).

In any event, platform (36) of article storage case (10) may assist the user with readily identifying and accessing a particular crayon (C) which the user desires to use by displaying crayons (C) in the aforementioned multi-tiered, cascading (or "stadium seating") arrangement such that at least the top (T) of each crayon (C) is readily visible to the user when viewing article storage case (10) from the front, top, or either side thereof.

B. Exemplary Article Storage Case Having Removable Lid

Figure 4A:
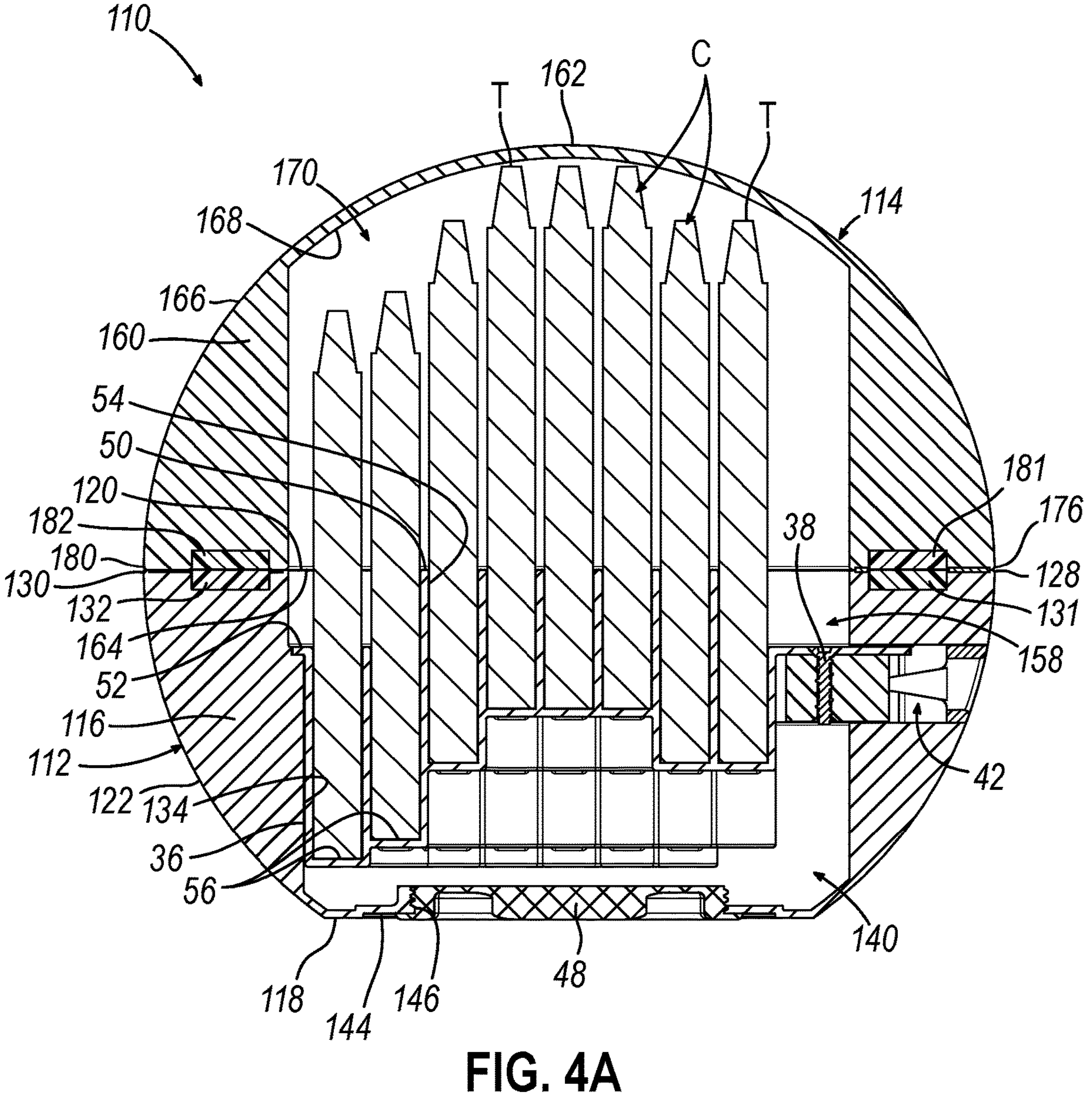
FIG. 4A depicts a cross sectional view of another exemplary article storage case, showing a lid of the article storage case in a closed state, and further showing the plurality of articles securely housed within a storage chamber of the article storage case.
Figure 4B:
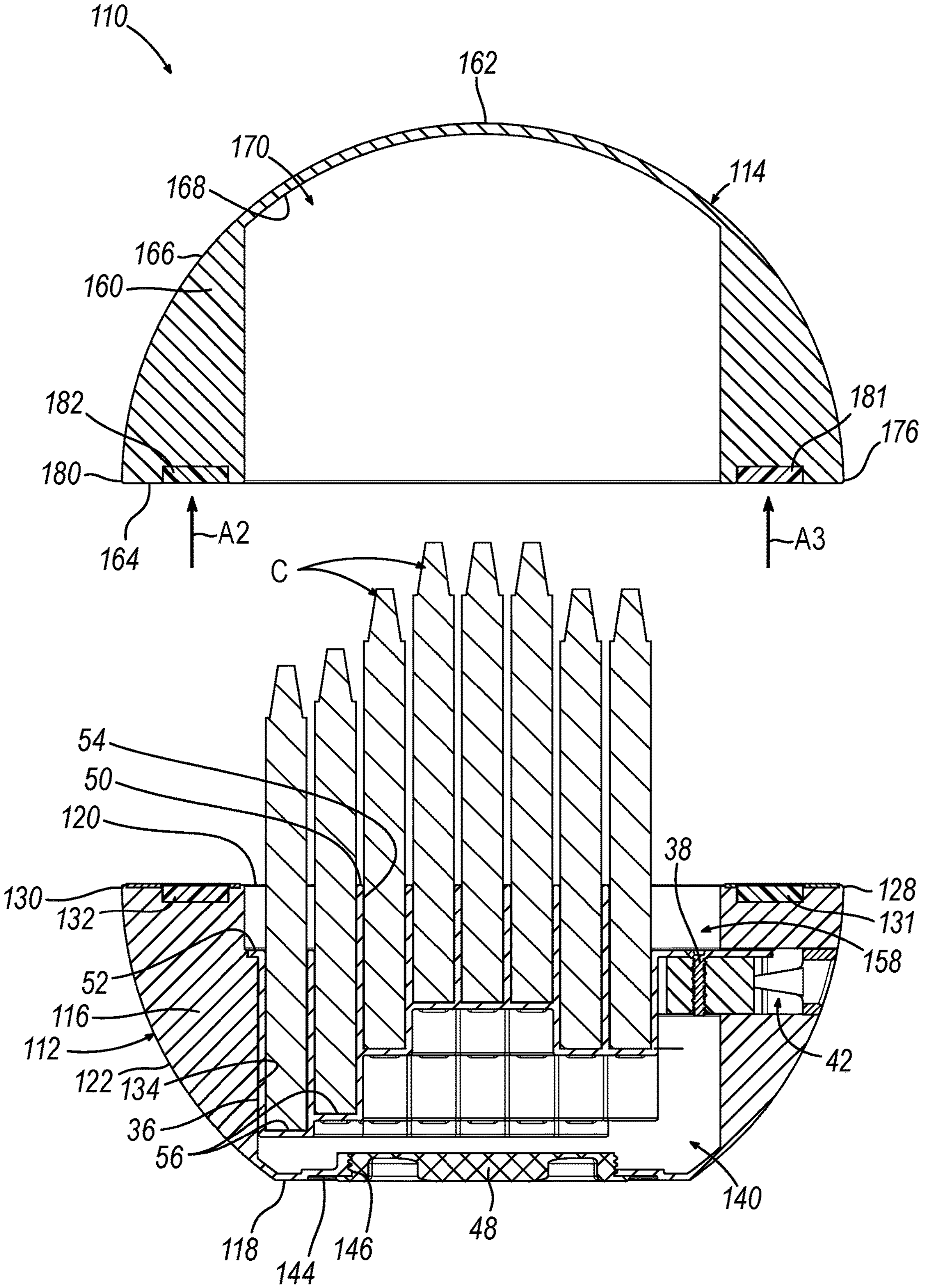
FIG. 4B depicts a cross sectional view similar to FIG. 4A, showing the lid removed from the base to define an open state for displaying and accessing the plurality of articles.

FIGS. 4A-4B show another exemplary article storage case (110) comprising a base (112) and a lid (114) movably coupled to base (112) such that lid (114) is movable relative to base (112) between a closed state for securely storing a plurality of drawing utensils such as crayons (C) (FIG. 4A) and an open state for displaying and providing easy access to crayons (C) (FIG. 4B). Article storage case (110) is similar to article storage case (10) described above except as otherwise described below.

Base (112) of the present example includes a lower body (116) having a generally flat, annular external bottom surface (118), a generally flat, annular top surface (120), and a generally hemispherical external side surface (122) such that base (112) has a generally truncated hemispherical profile. First and second ends (128, 130) of base (112) are defined opposite each other, and first and second lower magnets (131, 132) having a first polarity are positioned at or near respective ends (128, 130), as described in greater detail below.

Lower body (116) also defines a lower interior cavity (134), and base (112) further includes platform (36) positioned at least partially within lower interior cavity (134). In the example shown, platform (36) is spaced apart from a bottom of lower interior cavity (134) to define a waste chamber (140). In this regard, base (112) of the present example further includes sharpener (42) extending radially inwardly from external side surface (122) at or near first end (128) below platform (36) into waste chamber (140) and fixedly secured to platform (36) via a fastener, such as a screw (38). Lower body (116) includes an annular recess (144) defined in bottom surface (118) and an opening (146) defined in recess (144) for selectively receiving dump door (48) of base (112). In the example shown, second top surface (52) of platform (36) is spaced apart from a top of lower interior cavity (134) to define a lower storage chamber portion (158).

Lid (114) of the present example includes an upper body (160) having a top (162), a generally flat, annular bottom surface (164) configured to abut or otherwise confront top surface (120) of base (112) when lid (114) is in the closed state, and a generally hemispherical external side surface (166). Upper body (160) includes a generally dome-shaped internal ceiling surface (168) which defines an upper storage chamber portion (170) configured to communicate with lower storage chamber portion (158) to collectively define a storage chamber and to receive at least tops (T) of crayons (C) retained in bores (54) when lid (114) is in the closed state, as best shown in FIG. 4A, in a manner similar to that described above with respect to FIGS. 1A-3B.

In the example shown, first and second ends (176, 180) of lid (114) are defined opposite each other and configured to abut or otherwise confront first and second ends (128, 130) of base (112), respectively, when lid (114) is in the closed state and to be spaced apart from first and second ends (128, 130) of base (112) when lid (114) is in the open state. First and second upper magnets (181, 182) having a second polarity different from the first polarity are positioned at or near respective ends (176, 180) and are configured to magnetically attract first and second lower magnets (131, 132) of base (112), respectively, when lid (114) is in the closed state.

In this regard, lid (114) of the present example is removably coupled to base (112) via the magnetic attraction between lower magnets (131, 132) and upper magnets (181, 182) such that lid (114) is removable from base (112) from the closed state (FIG. 4A) to the open state (FIG. 4B). Moreover, lid (114) may be selectively maintained in the closed state to prevent lid (114) from inadvertently moving from the closed state toward the open state via the magnetic attraction between lower magnets (131, 132) and upper magnets (181, 182). More particularly, such magnetic attraction may resist movement of lid (114) from the closed state toward the open state. For example, lower magnets (131, 132) and upper magnets (181, 182) may be configured to cooperatively prevent movement of lid (114) from the closed state toward the open state until a threshold separation force is applied by a user between lid (114) and base (112) sufficient to overcome the magnetic attraction between lower magnets (131, 132) and upper magnets (181, 182) and thereby remove (or "lift off") lid (114) from base (112), as indicated by arrows (A2, A3) in FIG. 4B.

While lower magnets (131, 132) have been described as having a first polarity and upper magnets (181, 182) have been described as having a second polarity, such that either lower magnet (131, 132) may be capable of magnetically attracting either upper magnet (181, 182), magnets (131, 132, 181, 182) may have any suitable polarities. For example, first lower magnet (131) may have a first polarity, second lower magnet (132) may have a second polarity, first upper magnet (181) may have the second polarity, and second upper magnet (182) may have the first polarity, such that first lower magnet (131) may be limited to magnetically attracting first upper magnet (181) and such that second lower magnet (132) may be limited to magnetically attracting second upper magnet (182). Such a configuration may effectively limit the orientation of lid (114) relative to base (112) when removably coupled thereto to a predetermined orientation, which may be desirable in some versions, such as to ensure that any indicia on external side surfaces (122, 166) are properly aligned with each other in a predetermined manner.

Thus, magnets (131, 132, 181, 182) may collectively define a pair of magnetic latches of article storage case (110). It will be appreciated that any other suitable type of latches may be used in place of or in addition to this magnetic latch for removably coupling lid (114) to base (112) and/or selectively maintaining lid (114) in the closed state, such as clasping latches, snap-fit latches, or hook-and-loop latches, for example.

C. Second Exemplary Article Storage Case Having Pivotable Lid

Figure 7:
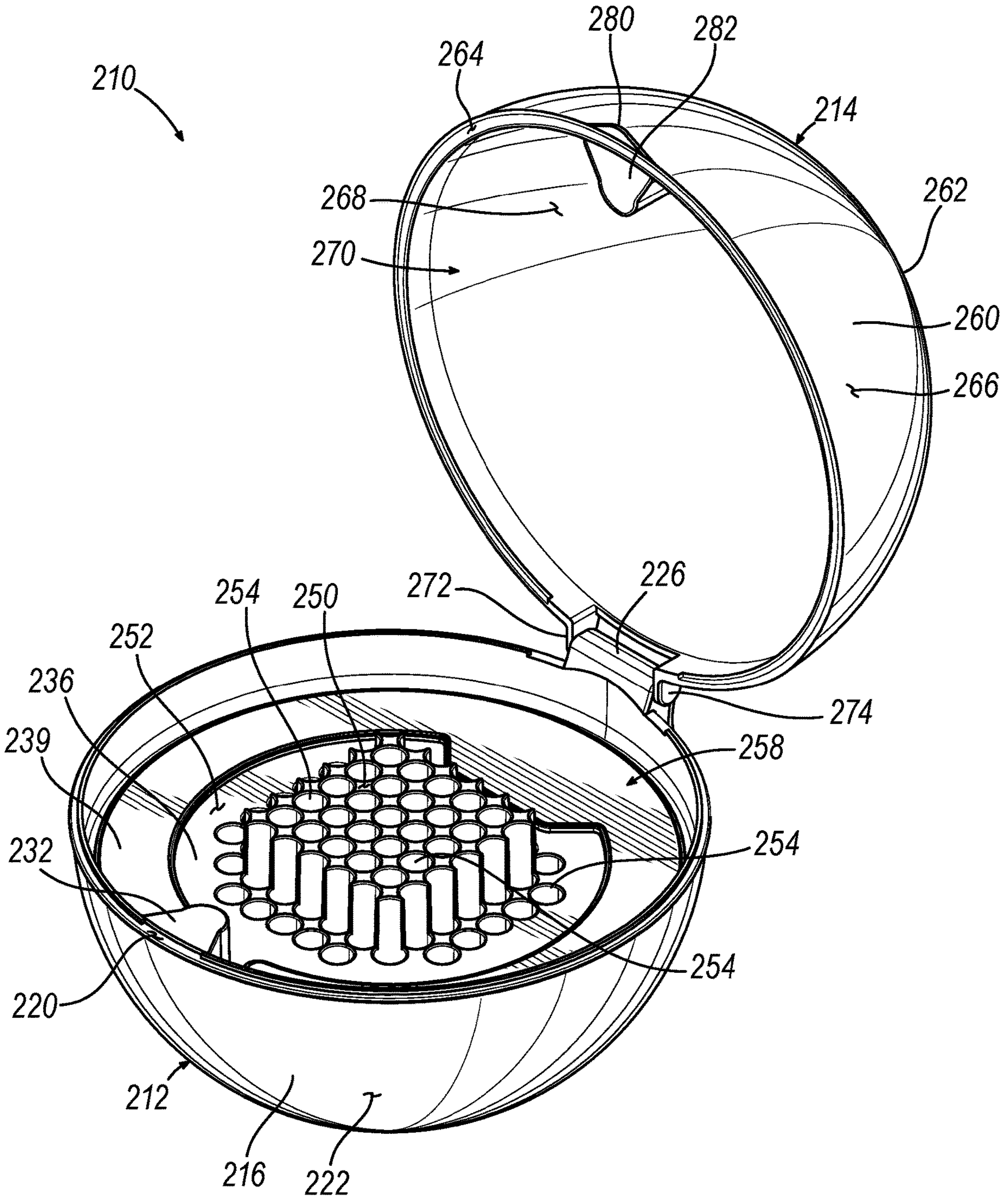
FIG. 7 depicts an upper front perspective view similar to FIG. 5, showing the lid in an open state, omitting the plurality of articles.

FIGS. 5-8 show another exemplary article storage case (210) comprising a base (212) and a lid (214) movably coupled to base (212) such that lid (214) is movable relative to base (212) between a closed state for securely storing a plurality of drawing utensils such as crayons (C) (FIGS. 5, 6, and 8) and an open state for displaying and providing easy access to crayons (C) (FIG. 7). Article storage case (210) is similar to article storage case (10) described above except as otherwise described below.

Base (212) of the present example includes a lower body (216) having a generally flat, annular external bottom surface (218) for stably supporting lower body (216) on a flat surface (e.g., a tabletop), a generally flat, annular top surface (220), a generally hemispherical external side surface (222) extending upwardly and radially outwardly from bottom surface (218) to top surface (220), and a generally rectangular rear protrusion (224) such that base (212) has a generally truncated hemispherical profile. In the example shown, lower body (216) further includes a lower hinge knuckle (226) extending upwardly relative to top surface (220) above rectangular rear protrusion (224) to define a hinged end (228) of base (212). An occluding end (230) of base (212) is defined opposite hinged end (228), and a lower magnet (232) having a first polarity is positioned at or near occluding end (230), as described in greater detail below.

Figure 8:
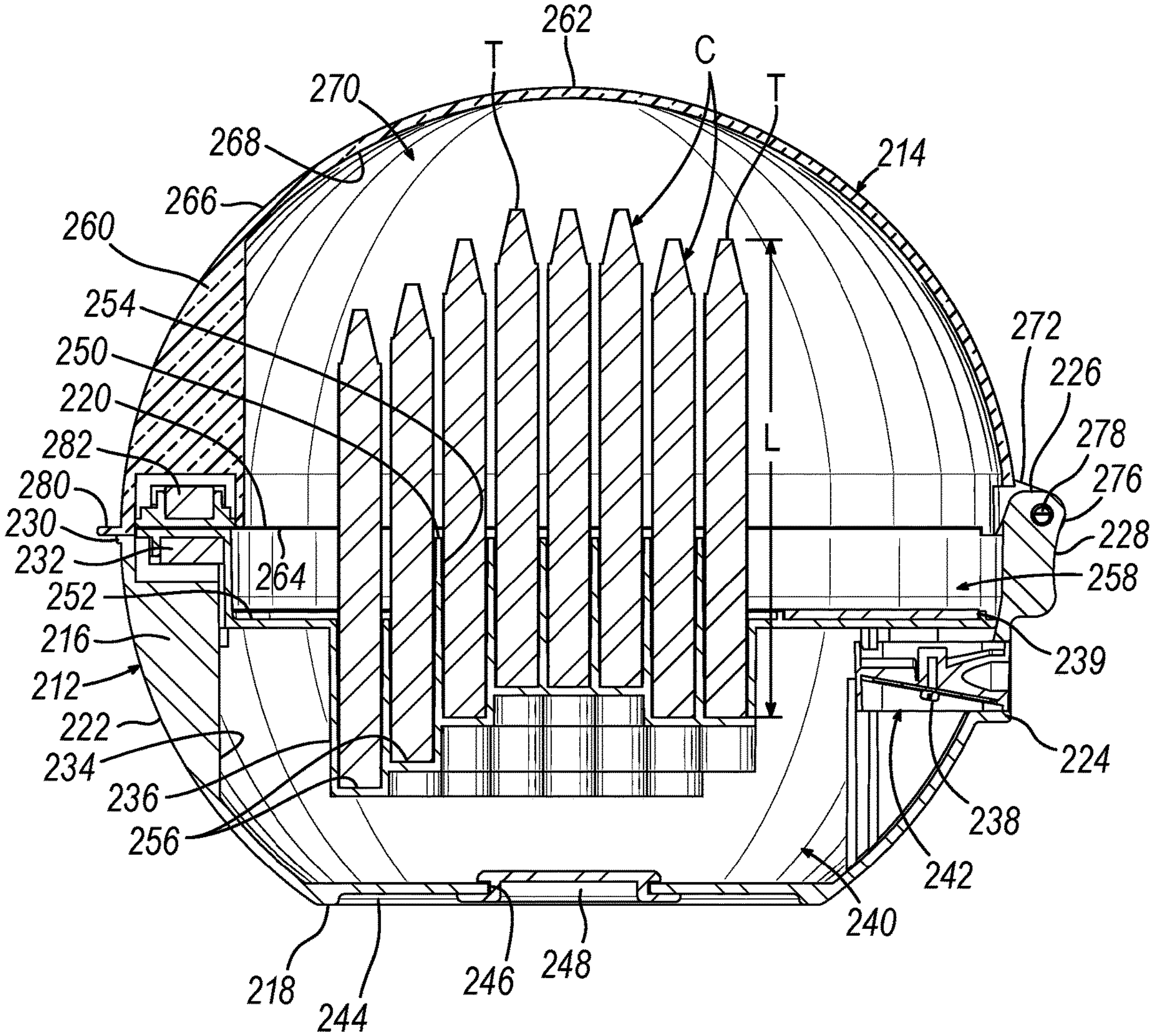
FIG. 8 depicts a cross sectional view of the article storage case of FIG. 5, taken along section line 8-8 in FIG. 5, showing the lid in the closed state, and further showing the plurality of articles securely housed within a storage chamber of the article storage case.

As best shown in FIG. 8, lower body (216) also defines a lower interior cavity (234), and base (212) further includes a platform (236) positioned at least partially within lower interior cavity (234) and fixedly secured to lower body (216) via one or more fasteners, such as screws (not shown), which may be concealed by a generally annular cover (239). In the example shown, platform (236) is spaced apart from a bottom of lower interior cavity (234) to define a waste chamber (240). In this regard, base (212) of the present example further includes a sharpener (242) extending radially inwardly from rear protrusion (224) below platform (236) into waste chamber (240) and fixedly secured to platform (236) via another fastener, such as a screw (238). Sharpener (242) is configured to sharpen crayons (C) and to deposit shavings caused by such sharpening directly into waste chamber (240). As shown, lower body (216) includes an annular recess (244) defined in bottom surface (218) and an opening (246) defined in recess (244) in communication with waste chamber (240). Recess (244) and/or opening (246) may be configured to selectively receive a dump door (248) of base (212). More particularly, dump door (248) may be removably coupled to lower body (216) at recess (244) and/or opening (246) to selectively cover opening (246) for selectively maintaining shavings within waste chamber (240) and selectively emptying shavings from waste chamber (240). For example, dump door (248) may be configured to threadably and/or frictionally engage lower body (216) at recess (244) for facilitating removable coupling of dump door (248) thereto. In some versions, dump door (248) may be recessed from and/or substantially flush with bottom surface (218) when removably coupled to lower body (216) to avoid interfering with and/or to assist with stably supporting lower body (216) on a flat surface.

Platform (236) of the present example includes first and second upwardly-facing top surfaces (250, 252) and an array of receptacles in the form of bores (254) extending downwardly from first and/or second top surfaces (250, 252) to respective upwardly-facing floor support surfaces (256) for receiving corresponding crayons (C). In the example shown, second top surface (252) is spaced apart from a top of lower interior cavity (234) to define a lower storage chamber portion (258), as described in greater detail below.

First top surface (250) is radially inward of and raised above second top surface (252), and floor support surfaces (256) are provided at varying heights relative to bottom surface (218) such that platform (236) has a generally stepped profile. More particularly, at least some radially adjacent (e.g., adjacent to each other in a radial direction) sets of floor support surfaces (256) are vertically offset (or "staggered") from each other such that when crayons (C) having a same length (L) as each other are positioned on vertically offset floor support surfaces (256), the tops (T) of such crayons (C) are likewise vertically offset from each other in a multi-tiered arrangement. For example, floor support surfaces (256) may be progressively higher in a radially inward direction, such that the radially outermost floor support surfaces (256) are at a minimum height, the radially innermost floor support surfaces (256) are at a maximum height, and the radially intermediate floor support surfaces (256) are at intermediate heights progressively increasing from the radially outermost floor support surfaces (256) toward the radially innermost floor support surfaces (256). As shown, the height differential between radially adjacent sets of floor support surfaces (256) may also vary, and some radially adjacent sets of floor support surfaces (256) may be positioned at a same height as each other, such as those at or near the radially innermost floor support surfaces (256) and/or those proximate to hinged end (228). Moreover, at least some circumferentially or otherwise perimetrically adjacent (e.g., adjacent to each other in a circumferential or otherwise perimetrical direction) sets of floor support surfaces (256) may be positioned at a same height as each other. In this manner, when crayons (C) having the same length (L) as each other are positioned on floor support surfaces (256), the tops (T) of such crayons (C) may cascade downwardly in a radially outward direction to provide a "stadium seating" arrangement (e.g., when viewed from the front or either side of article storage case (210)).

In the example shown, floor support surfaces (256) of platform (236) are positioned at four different heights (e.g., relative to bottom surface (218)). More particularly, at least some of a first, radially outermost set of circumferentially adjacent floor support surfaces (256) are each positioned at a first height (some members of this set may be omitted proximate to hinged end (228), such as to accommodate sharpener (242)). At least some of a second set of circumferentially adjacent floor support surfaces (256) radially adjacent to the first set in the radially inward direction are each positioned at a second height (some members of this set, such as those proximate to hinged end (228), may alternatively be positioned at a third height). At least some of a third set of circumferentially adjacent floor support surfaces (256) radially adjacent to the second set in the radially inward direction are each positioned at a third height. At least some of a fourth set of circumferentially adjacent floor support surfaces (256) radially adjacent to the third set in the radially inward direction are each positioned at a fourth height. The radially innermost floor support surfaces (256) radially adjacent to the fourth set in the radially inward direction are also positioned at the fourth height.

As shown, each bore (254) is configured to receive a corresponding crayon (C).

Bores (254) may be configured to retain the corresponding crayons (C) in a secure and upright manner. For example, bores (254) may each have a diameter equal to or slightly greater than a diameter of crayons (C) so as to frictionally engage the corresponding crayon (C). Additionally, or in the alternative, bores (254) may have a depth equal to or greater than about a third of the length (L) of crayons so as to receive a substantial portion of the corresponding crayon (C) sufficient to prevent the corresponding crayon (C) from tipping over while also allowing a top (T) of the corresponding crayon (C) to protrude sufficiently therefrom for gripping by the user. While platform (236) of the present example includes receptacles in the form of a plurality of discrete bores (254) isolated from each other for receiving individual respective crayons (C), it will be appreciated that any other suitable type of receptacle may used for receiving crayons (C), such as annular or semi-annular recesses for receiving pluralities of respective crayons (C). Radially adjacent sets of such recesses may be either isolated from or in communication with each other, and may have vertically offset floor support surfaces arranged in a manner similar to floor support surfaces (256).

Figure 5:
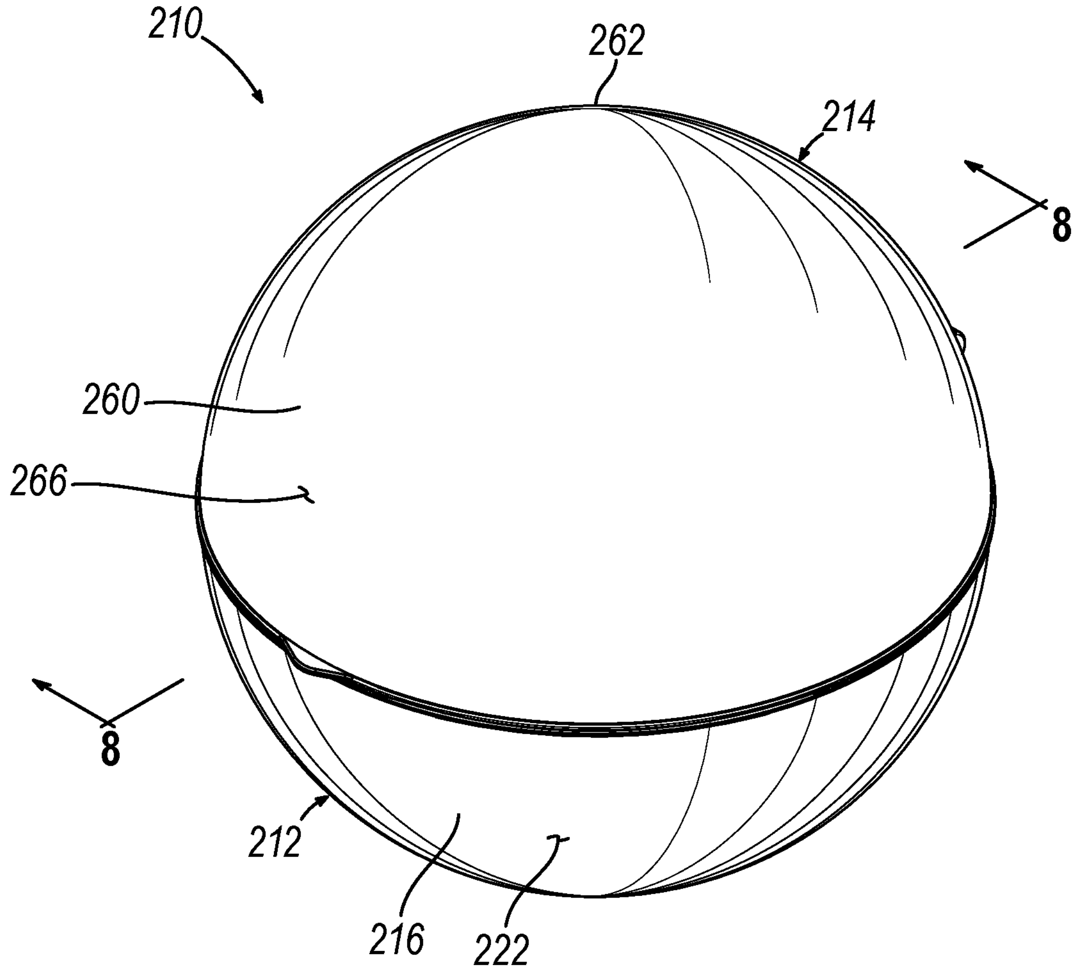
FIG. 5 depicts an upper front perspective view of another exemplary article storage case, showing a lid of the article storage case in a closed state.
Figure 6:
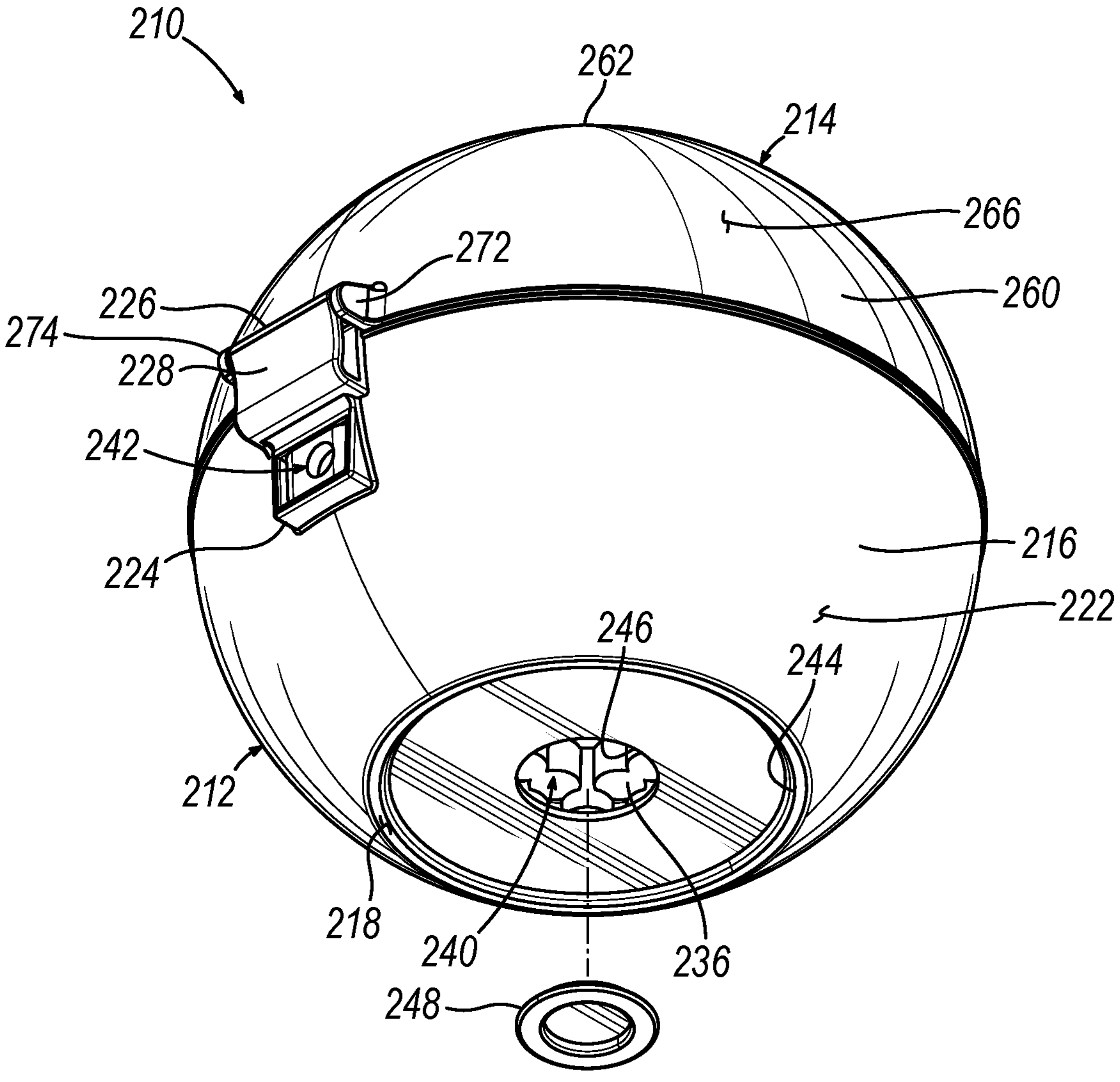
FIG. 6 depicts a lower rear perspective view of the article storage case of FIG. 5, showing the lid in the closed state, and further showing a dump door of the base selectively removed from a lower body of the base for accessing a waste chamber of the base.

Lid (214) of the present example includes an upper body (260) having a top (262), a generally flat, annular bottom surface (264) configured to abut or otherwise confront top surface (220) of base (212) when lid (214) is in the closed state, and a generally hemispherical external side surface (266) extending upwardly and radially inwardly from bottom surface (264) to top (262) such that lid (214) has a generally hemispherical profile. In some versions, hemispherical external side surfaces (222, 266) of lower and upper bodies (216, 260) may have a same or similar radius as each other, such that base (212) and lid (214) may collectively provide article storage case (210) with a generally spherical (e.g., truncated spherical) profile when lid (214) is in the closed state, as best shown in FIG. 5.

Upper body (260) includes a generally dome-shaped internal ceiling surface (268) which defines an upper storage chamber portion (270) configured to communicate with lower storage chamber portion (258) to collectively define a storage chamber and to receive at least tops (T) of crayons (C) retained in bores (254) when lid (214) is in the closed state, as best shown in FIG. 8. In this regard, ceiling surface (268) is spaced apart from top surfaces (250, 252) of platform when lid (214) is in the closed state to accommodate the staggered heights of tops (T) of crayons (C) by providing upper storage chamber portion (270) with a maximum height at or near a radially innermost portion thereof to fit the maximum heights of tops (T) of crayons (C) supported by radially innermost floor support surfaces (256). Ceiling surface (268) is also suitably shaped to provide a gradually decreasing height of upper storage chamber portion (270) in the radially outward direction to generally track the decreasing heights of tops (T) of crayons (C) in the radially outward direction. For example, ceiling surface (268) may be vertically spaced apart from each floor support surface (256) when lid (214) is in the closed state by at least a minimum clearance equal to or greater than the length (L) of crayons (C).

In the example shown, upper body (260) further includes a pair of upper hinge knuckles (272, 274) extending outwardly relative to hemispherical external side surface (266) and spaced apart from each other to receive lower hinge knuckle (226) therebetween and to define a hinged end (276) of lid (214) that is configured to pivotably couple to hinged end (228) of base (212). In this regard, lid (214) of the present example is pivotably coupled to base (212) via a hinge pin (278) extending through lower and upper hinge knuckles (226, 272, 274) such that lid (214) is pivotable about hinge pin (278) relative to base (212) between the closed state (FIGS. 5, 6, and 8) in which crayons (C) are securely housed within the storage chamber and the open state (FIG. 7) in which crayons (C) are displayed in an organized and accessible manner. Thus, hinge knuckles (226, 272, 274) and hinge pin (278) may collectively define a hinge of article storage case (210). In some versions, lid (214) may be resiliently biased toward one of the open or closed states, such as via a torsion spring or any other suitable biasing member (not shown) incorporated into the hinge.

An occluding end (280) of lid (214) is defined opposite hinged end (276) and is configured to abut or otherwise confront occluding end (230) of base (212) when lid (214) is in the closed state and to be spaced apart from occluding end (230) of base (212) by a distance sufficiently great to allow the user to position crayons (C) within bores (254) and remove crayons (C) therefrom when lid (214) is in the open state. An upper magnet (282) having a second polarity different from the first polarity is positioned at or near occluding end (280) and is configured to magnetically attract lower magnet (232) of base (212) when lid (214) is in the closed state. In this regard, lid (214) may be selectively maintained in the closed state, to prevent lid (214) from inadvertently pivoting from the closed state toward the open state, via the magnetic attraction between lower and upper magnets (232, 282). More particularly, such magnetic attraction may resist pivoting of lid (214) from the closed state toward the open state. For example, lower and upper magnets (232, 282) may be configured to cooperatively prevent pivoting of lid (214) from the closed state toward the open state until a threshold separation force is applied by a user between lid (214) and base (212) sufficient to overcome the magnetic attraction between lower and upper magnets (232, 282) and thereby pivot lid (214) away from base (212). Thus, magnets (232, 282) may collectively define a magnetic latch of article storage case (210). It will be appreciated that any other suitable type of latch may be used in place of or in addition to this magnetic latch for selectively maintaining lid (214) in the closed state, such as a clasping latch, a snap-fit latch, or a hook-and-loop latch, for example.

In some versions, upper body (260) may be constructed of a transparent material to allow the user to view crayons (C) within the storage chamber through upper body (260) while lid (214) is in the closed state. In addition, or alternatively, one or more external surfaces of base (212) and/or lid (214), such as external side surfaces (222, 266) of lower and/or upper bodies (216, 260), may include indicia and/or embossed elements which may be representative of an object having a similar external shape as article storage case (210), such as an object having a generally spherical shape. For example, external side surfaces (222, 266) of lower body (216) and upper body (260) may include indicia and/or embossed elements collectively representative of a globe (e.g., of Earth), such as for educational purposes. Such indicia may be printed or otherwise affixed to external side surfaces (222, 266) of lower body (216) and/or upper body (260). Thus, the generally spherical shape of article storage case (210) when lid (214) is in the closed position may allow article storage case (210) to simulate other generally spherical objects. In addition, or alternatively, the generally spherical shape of article storage case (210) when lid (214) is in the closed position may assist the user with gripping or otherwise handling article storage case (210).

In any event, platform (236) of article storage case (210) may assist the user with readily identifying and accessing a particular crayon (C) which the user desires to use by displaying crayons (C) in the aforementioned multi-tiered, cascading (or "stadium seating") arrangement such that at least the top (T) of each crayon (C) is readily visible to the user when viewing article storage case (210) from the front, top, or either side thereof.

II. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A case for storing a plurality of articles, the case comprising: (a) a base including: (i) a lower body having: (A) a first generally hemispherical external side surface, (B) a generally flat external bottom surface, and (C) an interior cavity, and (ii) a platform fixedly secured to the lower body within the interior cavity, wherein the platform includes first and second receptacles configured to retain first and second articles of the plurality of articles, respectively, at first and second heights relative to the external bottom surface, respectively, wherein the first height is different from the second height; and (b) a lid coupled to the base such that the lid is movable relative to the base between an open state and a closed state, wherein the lid includes an upper body having: (i) a second generally hemispherical external side surface, and (ii) a generally dome-shaped internal ceiling surface at least partially defining a storage chamber for receiving at least tops of the plurality of articles when the lid is in the closed state.

Example 2

The case of Example 1, wherein the platform further includes: (a) at least one top surface, and (b) first and second floor support surfaces positioned at the first and second heights, respectively, wherein the first and second receptacles extend from the at least one top surface to the first and second floor surfaces, respectively.

Example 3

The case of Example 2, wherein the first and second floor support surfaces are radially adjacent to each other.

Example 4

The case of any of Examples 2 through 3, wherein the first floor support surface is positioned radially outwardly relative to the second floor support surface, wherein the first height is less than the second height.

Example 5

The case of any of the preceding Examples, wherein at least one of the first or second receptacles includes at least one of a bore or a recess.

Example 6

The case of any of the preceding Examples, wherein the first and second generally hemispherical external side surfaces have a same radius.

Example 7

The case of any of the preceding Examples, wherein the lid is pivotably coupled to the base such that the lid is pivotable relative to the base between the open state and the closed state.

Example 8

The case of any of the preceding Examples, wherein the lid is removably coupled to the base such that the lid is removable from the base to define the open state.

Example 9

The case of any of the preceding Examples, further comprising at least one latch configured to selectively maintain the lid in the closed state.

Example 10

The case of Example 9, wherein the at least one latch includes a lower magnet presented by the base and an upper magnet presented by the lid, wherein the lower magnet is configured to magnetically attract the upper magnet when the lid is in the closed state.

Example 11

The case of any of the preceding Examples, wherein the base further includes a sharpener secured to the lower body and extending into the interior cavity.

Example 12

The case of Example 11, wherein the platform is spaced apart from a bottom of the interior cavity to define a waste chamber for receiving shavings from the sharpener.

Example 13

The case of Example 12, wherein the lower body includes an opening defined in the external bottom surface and in communication with the waste chamber, wherein the base further includes a dump door coupled to the lower body for selectively covering the opening.

Example 14

The case of any of the preceding Examples, wherein the lid further includes a pinch guard secured to the second generally hemispherical external side surface of the upper body.

Example 15

A storage system, comprising: (a) the case of any of the preceding Examples; and (b) a plurality of articles, wherein the plurality of articles includes first and second articles having a same length as each other, wherein the first and second articles include first and second tops, respectively, wherein the first article is retained by the first receptacle, wherein the second article is retained by the second receptacle such that the first and second tops are vertically offset from each other.

Example 16

A case for storing a plurality of articles, the case comprising: (a) a base including: (i) a lower body having a first generally hemispherical external side surface, wherein the lower body defines an interior cavity, and (ii) a platform fixedly secured to the lower body within the interior cavity, wherein the platform includes: (A) a first plurality of perimetrically adjacent floor support surfaces positioned at a first height, (B) a second plurality of perimetrically adjacent floor support surfaces positioned at a second height different from the first height, wherein the second plurality of perimetrically adjacent floor support surfaces is radially adjacent to the first plurality of perimetrically adjacent floor support surfaces, (C) a first plurality of bores extending downwardly to the first plurality of perimetrically adjacent floor support surfaces, wherein each of the first plurality of bores is configured to retain a respective article of the plurality of articles, and (D) a second plurality of bores extending downwardly to the second plurality of perimetrically adjacent floor support surfaces, wherein each of the second plurality of bores is configured to retain a respective article of the plurality of articles; and (b) a lid coupled to the base such that the lid is movable relative to the base between an open state and a closed state, wherein the lid includes an upper body having: (i) a second generally hemispherical external side surface, and (ii) a generally dome-shaped internal ceiling surface at least partially defining a storage chamber for receiving at least tops of the plurality of elongate articles when the lid is in the closed state.

Example 17

The case of Example 16, wherein the first plurality of perimetrically adjacent floor support surfaces are positioned radially outwardly relative to the second plurality of perimetrically adjacent floor support surfaces, wherein the first height is less than the second height.

Example 18

A storage system, comprising: (a) the case of any of Examples 16 through 17; and (b) a plurality of elongate articles, wherein the plurality of elongate articles includes first and second elongate articles having a same length as each other, wherein the first and second elongate articles include first and second tops, respectively, wherein the first elongate article is retained by one of the first plurality of bores on one of the first plurality of perimetrically adjacent floor support surfaces, wherein the second elongate article is retained by one of the second plurality of bores on one of the second plurality of perimetrically adjacent floor support surfaces such that the first and second tops are vertically offset from each other.

Example 19

A method of storing a plurality of articles in a case having (a) a base including (i) a lower body having a first generally hemispherical external side surface, and (ii) a platform fixedly secured to the lower body, wherein the platform includes: (A) first and second floor support surfaces positioned at first and second heights, respectively, wherein the first height is different from the second height, and (B) first and second receptacles extending downwardly to the first and second floor surfaces, respectively, and (b) a lid, wherein the lid includes an upper body having (i) a second generally hemispherical external side surface, and (ii) a generally dome-shaped internal ceiling surface at least partially defining a storage chamber, the method comprising: (a) retaining a first article of the plurality of articles having a first top in the first receptacle on the first floor support surface; (b) retaining a second article of the plurality of articles having a second top in the second receptacle on the second floor support surface such that the second top is vertically offset from the first top; and (c) moving the lid relative to the base from an open state to a closed state such that the first and second tops are received within the storage chamber and such that the case has a generally spherical profile.

Example 20

The method of Example 19, wherein moving the lid relative to the base includes at least one of pivoting the lid relative to the base or removably coupling the lid to the base.

III. Miscellaneous

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those skilled in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A case for storing a plurality of articles, the case comprising:

(a) a base including:

(i) a lower body having:

(A) a first generally hemispherical external side surface, (B) a generally flat external bottom surface having an opening, and (C) an interior cavity, (ii) a sharpener secured to the lower body and extending into the interior cavity, (iii) a platform fixedly secured to the lower body within the interior cavity, wherein the platform includes first and second receptacles configured to retain first and second articles of a plurality of articles, respectively, at first and second heights relative to the external bottom surface, respectively, wherein the first height is different from the second height, wherein the platform is spaced apart from a bottom of the interior cavity to define a waste chamber that communicates with the opening in the external bottom surface and is configured to receive shavings from the sharpener, and (iv) a dump door coupled to the lower body for selectively covering the opening; and (b) a lid coupled to the base such that the lid is movable relative to the base between an open state and a closed state, wherein the lid includes an upper body having:

(i) a second generally hemispherical external side surface, and (ii) a generally dome-shaped internal ceiling surface at least partially defining a storage chamber for receiving at least tops of the plurality of articles when the lid is in the closed state.

2. The case of claim 1, wherein the platform further includes:

(a) at least one top surface, and (b) first and second floor support surfaces positioned at the first and second heights, respectively, wherein the first and second receptacles extend from the at least one top surface to the first and second floor surfaces, respectively.

3. The case of claim 2, wherein the first and second floor support surfaces are radially adjacent to each other.

4. The case of claim 3, wherein the first floor support surface is positioned radially outwardly relative to the second floor support surface, wherein the first height is less than the second height.

5. The case of claim 1, wherein at least one of the first or second receptacles includes at least one of a bore or a recess.

6. The case of claim 1, wherein the first and second generally hemispherical external side surfaces have a same radius.

7. The case of claim 1, wherein the lid is pivotably coupled to the base such that the lid is pivotable relative to the base between the open state and the closed state.

8. The case of claim 1, further comprising at least one latch configured to selectively maintain the lid in the closed state.

9. The case of claim 8, wherein the at least one latch includes a lower magnet presented by the base and an upper magnet presented by the lid, wherein the lower magnet is configured to magnetically attract the upper magnet when the lid is in the closed state.

10. A storage system, comprising:

(a) the case of claim 1; and (b) a plurality of articles, wherein the plurality of articles includes first and second articles having a same length as each other, wherein the first and second articles include first and second tops, respectively, wherein the first article is retained by the first receptacle, wherein the second article is retained by the second receptacle such that the first and second tops are vertically offset from each other.

11. A case for storing a plurality of articles, the case comprising:

(a) a base including:

(i) a lower body having a first generally hemispherical external side surface, wherein the lower body defines an interior cavity, (ii) a sharpener secured to the lower body and extending into the interior cavity, (iii) a platform secured to the lower body within the interior cavity, wherein the platform includes a plurality of receptacles configured to retain a plurality of articles therein, wherein the platform is spaced apart from a bottom of the interior cavity to define a waste chamber configured to receive shavings from the sharpener, and (iv) a movable covering coupled to the lower body and configured to provide access to the waste chamber through an opening in the lower body; and (b) a lid coupled to the base such that the lid is movable relative to the base between an open state and a closed state, wherein the lid includes an upper body having:

(i) a second generally hemispherical external side surface, and (ii) a generally dome-shaped internal ceiling surface at least partially defining a storage chamber for receiving at least tops of the plurality of elongate articles when the lid is in the closed state.

12. A storage system, comprising:

(a) the case of claim 11; and (b) a plurality of elongate articles positioned within the receptacles.

* * * * *